(12) United States Patent
Roos et al.

(10) Patent No.: US 12,358,219 B2
(45) Date of Patent: Jul. 15, 2025

(54) DEVICE AND METHOD FOR THE DEPOSITION OF A MATERIAL LAYER ON A SURFACE AREA OF A WORKPIECE

(71) Applicant: Helmholtz-Zentrum Geesthacht Zentrum für Material- und Küstenforschung GmbH, Geesthacht (DE)

(72) Inventors: Arne Roos, Hamburg (DE); Luciano Bergmann, Geesthacht (DE); Jorge Fernandez Dos Santos, Tespe (DE); Henry Loitz, Hamburg (DE)

(73) Assignee: Helmholtz-Zentrum Geesthacht Zentrum für Material- und Küstenforschung GmbH, Geesthacht (DE)

( * ) Notice: Subject to any disclaimer, the term of this patent is extended or adjusted under 35 U.S.C. 154(b) by 1202 days.

(21) Appl. No.: 17/064,897

(22) Filed: Oct. 7, 2020

(65) Prior Publication Data

US 2021/0146615 A1     May 20, 2021

(30) Foreign Application Priority Data

Nov. 15, 2019   (EP) .................................... 19209603

(51) Int. Cl.
*B23K 20/00*      (2006.01)
*B23K 20/12*      (2006.01)
(Continued)

(52) U.S. Cl.
CPC ........ *B29C 64/209* (2017.08); *B23K 20/1215* (2013.01); *B23K 20/122* (2013.01); *B29C 64/321* (2017.08); *B33Y 30/00* (2014.12)

(58) Field of Classification Search
CPC ............. B23K 20/128; B23K 20/1215; B23K 20/122; B23K 20/1255; B23K 20/1225; B23K 20/126; B23K 20/129
See application file for complete search history.

(56) References Cited

U.S. PATENT DOCUMENTS

| | | | |
|---|---|---|---|
| 5,813,592 A | * | 9/1998 | Midling ............ B29C 66/43441 228/2.1 |
| 7,882,998 B2 | | 2/2011 | Roos et al. |

(Continued)

FOREIGN PATENT DOCUMENTS

| | | |
|---|---|---|
| EP | 1952931 A1 | 8/2008 |
| EP | 3415299 A1 | 12/2018 |

OTHER PUBLICATIONS

European Search Report dated May 20, 2020, from the European Patent Office for corresponding European application No. EP 19209603.0.

*Primary Examiner* — Erin B Saad
(74) *Attorney, Agent, or Firm* — REISING ETHINGTON, P.C.

(57) ABSTRACT

A device for depositing a material layer on a surface of a workpiece has a deposition facility with a hollow shoulder that is rotatable about an axis relative to a base. The shoulder has an indentation that is limited by a circumferential annular face. A passage opening, which is smaller in diameter than the indentation, is formed in the shoulder along the axis. The shoulder is rotated and a deposition material is fed through the passage opening into the indentation where it is plasticized in the indentation. The deposition facility is moved over the surface in such a way that the indentation points towards the surface and a workpiece plane runs tangentially to the surface at the point at which the axis intersects the surface. The annular face is distanced from the (Continued)

surface such that plasticized deposition material is deposited on the surface. A related deposition method is also provided.

13 Claims, 6 Drawing Sheets

(51) Int. Cl.
 *B29C 64/209* (2017.01)
 *B29C 64/321* (2017.01)
 *B33Y 30/00* (2015.01)

(56) References Cited

U.S. PATENT DOCUMENTS

| | | | |
|---|---|---|---|
| 8,025,827 B2 | 9/2011 | Filho et al. | |
| 8,518,198 B2 | 8/2013 | Filho et al. | |
| 8,714,431 B2 | 5/2014 | Roos et al. | |
| 8,893,951 B2 | 11/2014 | Santos et al. | |
| 9,457,513 B2 | 10/2016 | Hutsch et al. | |
| 9,700,958 B2 | 6/2017 | Bergmann et al. | |
| 9,925,717 B2 | 3/2018 | Filho et al. | |
| 9,925,720 B2 | 3/2018 | Abibe et al. | |
| 11,117,213 B2 * | 9/2021 | Rodriguez | B23K 20/22 |
| 11,458,564 B2 * | 10/2022 | Fleck | B23K 20/1255 |
| 11,465,349 B2 * | 10/2022 | Verma | B29C 64/321 |
| 11,772,188 B1 * | 10/2023 | Sargent | B33Y 30/00 |
| | | | 228/112.1 |
| 2008/0011810 A1 * | 1/2008 | Burford | B23K 20/1255 |
| | | | 228/2.1 |
| 2011/0131784 A1 | 6/2011 | Filho et al. | |
| 2012/0009339 A1 * | 1/2012 | Creehan | B23K 20/1245 |
| | | | 427/180 |
| 2012/0279441 A1 * | 11/2012 | Creehan | C23C 26/00 |
| | | | 228/2.1 |
| 2012/0279442 A1 * | 11/2012 | Creehan | C23C 26/00 |
| | | | 228/2.1 |
| 2013/0068825 A1 * | 3/2013 | Rosal | B23K 20/1215 |
| | | | 228/2.1 |
| 2013/0098534 A1 | 4/2013 | Filho et al. | |
| 2013/0134206 A1 | 5/2013 | Roos et al. | |
| 2016/0008918 A1 * | 1/2016 | Burford | B23K 20/1255 |
| | | | 228/2.1 |
| 2018/0085849 A1 * | 3/2018 | Kandasamy | B23K 20/129 |
| 2018/0354058 A1 * | 12/2018 | Twelves, Jr. | B23K 20/1215 |
| 2020/0189025 A1 * | 6/2020 | Rodriguez | B23K 20/22 |
| 2020/0331203 A1 * | 10/2020 | Verma | B23K 20/126 |
| 2021/0146471 A1 * | 5/2021 | Rodriguez | B23K 20/128 |
| 2023/0311241 A1 * | 10/2023 | Miyawaki | B23K 20/126 |
| | | | 228/112.1 |

* cited by examiner

DEVICE AND METHOD FOR THE DEPOSITION OF A MATERIAL LAYER ON A SURFACE AREA OF A WORKPIECE

CROSS-REFERENCE TO RELATED APPLICATIONS

This application claims the benefit and priority of European Patent Application No. 19209603.0 filed Nov. 15, 2019. The entire disclosure of the above application is incorporated by reference as if fully set forth herein.

FIELD

The present disclosure relates to a device and a method for the deposition of a material layer on a surface area of a workpiece.

BACKGROUND

Methods for the formation of a layer on a substrate or workpiece as well as devices for carrying out such methods are known in the prior art. For example, a layer may be formed on a workpiece in such a manner that a blank forming the deposition material is driven in a rotating manner and its end face is brought into contact with the workpiece, so that friction is produced between the blank and the substrate. Through this friction, a section of the blank is plasticized and the material of the blank is deposited on a surface area of the workpiece when the blank is moved over the surface area. The rotating blank can be moved in particular along a track over the surface area, such that blank material is gradually deposited on the surface area and thus the layer is formed on the workpiece. Such methods are also known as friction deposition welding methods.

In such a method, it is disadvantageous that the necessary rotation of the blank is technically difficult or even impossible to realize for certain blanks. This is the case in particular for blanks that are formed as long rods or are in roll form, as well as in the case of high required rotational speeds. Thus, the friction deposition welding described above is out of the question for certain deposition materials.

Further, the necessary rotation of the blank prevents a continuous feeding of the deposition material and thus reduces the speed with which the layer is deposited on the surface area.

Finally, the method described above is completely ruled out for deposition materials that are not sufficiently solid in rod form so that a rod can be driven in a rotating manner and plasticized through the input of friction energy on the end face. Further, with the friction deposition welding method, layers of materials that are too porous to be used in a rod form can be deposited.

It would therefore be desirable to provide a material deposition device and a corresponding method that enable a simple feeding of deposition material. In particular, it would be desirable for the strength of the deposition material in rod form to not be decisive.

SUMMARY

This section provides a general summary of the disclosure, and is not a comprehensive disclosure of its full scope or all of its features.

In one form, a deposition device for depositing a material layer on a surface area of a workpiece is provided. The deposition device including a holding facility, which is configured to receive the workpiece, and a deposition facility that has a base and a hollow shoulder that is driven in a rotating manner about a longitudinal axis relative to the base. The deposition facility and the holding facility can be moved in relation to one another. The holding facility is designed such that the workpiece is held on the holding facility so that the surface area of the workpiece points to the deposition facility. The hollow shoulder includes an indentation pointing vertically to the workpiece plane running along the longitudinal axis. The indentation is limited by a circumferential annular face about the longitudinal axis. The hollow shoulder is equipped with a passage opening running along the longitudinal axis, the diameter of which is smaller than that of the indentation. The deposition facility includes a feed facility for deposition material, which is arranged on the side of the hollow shoulder facing away from the workpiece plane such that deposition material can be introduced from the feed facility through the passage opening into the indentation. The deposition facility and the holding facility are movable relative to one another in such a manner that, during the relative movement, the workpiece plane runs tangentially to the surface area of the workpiece at the point at which the longitudinal axis intersects the surface of the workpiece.

With the device configured in this manner, an additional material layer can be deposited on a surface area of a workpiece in the following manner.

For this purpose, a device constructed in accordance with the present disclosure can include a deposition facility with a base. Optionally, the base can be mounted in a movable manner on a machine frame of the device. Further, the device may include a holding facility, which, may optionally be mounted on the machine frame in a processable manner and with which the workpiece can be held. The deposition facility may include a hollow shoulder driven in a rotating manner and equipped with an indentation, and the deposition facility can be moved towards the surface area of the workpiece to be coated in such a way that the hollow shoulder with this indentation lies directly opposite this surface area of the workpiece.

Deposition material is introduced into the indentation, which is limited externally by an annular face, and, through the rotation of the hollow shoulder, friction energy is continuously fed to the deposition material due to the friction between the hollow shoulder and the deposition material. Through this feeding of energy, the deposition material is plasticized in the indentation.

At this point, because the deposition facility and the holding facility can be moved relative to one another, the deposition facility can be moved along the surface area of the workpiece to be coated such that the workpiece plane of the deposition facility, which extends vertically to the longitudinal axis and thus to the axis of rotation of the hollow shoulder, always runs tangentially to the surface area of the workpiece.

The workpiece plane is determined by the position of the longitudinal axis of the deposition facility and thus the axis of rotation of the hollow shoulder and runs vertically to this axis of rotation. Further, the annular face that surrounds the indentation in the hollow shoulder is preferably designed in such a way that it extends parallel to the workpiece plane.

When the deposition facility and the holding facility are moved relative to one another for the deposition of the layer, this occurs according to the invention such that, during the relative movement, the workpiece plane runs tangentially to the surface area of the workpiece at the point at which the longitudinal axis intersects the surface of the workpiece.

Thus, even in the case of curved surface areas, it is ensured that the hollow shoulder is aligned correctly to the surface area.

In the simplest case of an even workpiece, this is achieved in that the hollow shoulder and/or the deposition facility are pushed parallel to the surface. Then, the workpiece plane is always tangential to the surface area of the workpiece at the point at which the longitudinal axis intersects the surface of the workpiece.

During the relative movement, the annular face of the hollow shoulder is slightly distanced from the surface area and thus from the workpiece plane, such that there remains a gap between the hollow shoulder on the one hand and the surface area on the other hand. Through this gap, plasticized material is pressed out of the indentation when the deposition facility is pushed and additional deposition material is conveyed through the passage opening, which extends parallel to the longitudinal axis and thus to the axis of rotation of the hollow shoulder, into the indentation. Due to the continuous introduction of friction energy through the contact of the rotating hollow shoulder with the plasticized material, this additional deposition material is similarly plasticized, such that the outflow of plasticized material is balanced by the newly added additional, and initially solid, deposition material due to the movement of the deposition facility over the surface area.

Because the passage opening extends along the longitudinal axis and thus the axis of rotation, it is not necessary for the deposition material to be present in rod form and, in particular, it does not also need to be rotated. Rather, the deposition material can be held in a rotation-proof manner relative to the base of the deposition facility but does not need to be rotated in any case. Further, it is also possible for the deposition material to not be present in rod form at all; rather, it can be fed to the passage opening only in powder form.

Accordingly, it is no longer necessary for the deposition material to be provided in solid rod form, as is the case in conventional friction deposition welding methods. Rather, in a device constructed in accordance with the present disclosure, a much greater degree of flexibility is given with respect to the deposition material.

In some forms, the hollow shoulder is designed such that the annular face, which externally limits the hollow shoulder, runs parallel to the workpiece plane. This ensures that when the hollow shoulders are rotating, a uniform gap is provided between the edge of the hollow shoulder on the one hand and the surface area of the workpiece on the other hand, in which the workpiece plane runs. Thus, a continuous and uniform deposition of the plasticized material on the workpiece surface is enabled.

In some forms, the deposition facility and holding facility are designed such that the annular face is distanced from the workpiece plane when the deposition facility and holding facility are moved relative to one another. Through this distance, the gap is given through which the plasticized material is pressed out of the indentation in the hollow shoulder and forms the layer on the surface area of the workpiece.

In some forms, the area of the surface of the hollow shoulder, which is provided between the annular face and the passage opening and limits the indentation, is formed as a circumferential friction face. This friction face surrounding the passage opening ensures that friction energy is efficiently input into the deposition material in the indentation due to the rotating drive of the hollow shoulder.

In some forms, the feed facility, with which the deposition material is fed to the passage opening and through it into the indentation, is formed by one or more guide elements that thus form a conveyance path for rod-shaped deposition material. The conveyance path extends along the longitudinal axis, about which the hollow shoulder is also driven in a rotating manner. In this manner, rod-shaped deposition material can be simply and safely conveyed into the area of the indentation.

In some forms, the at least one guide element can be formed as a radial bearing whose outer ring is fixed on the base or even onto the hollow shoulder while the rod-shaped material is fed through the inner ring, which is aligned with the passage opening.

In some forms, the inner ring remains rotation-proof against the base of the deposition facility and thus the deposition material, which can be formed in a rod-shaped manner, can remain similarly rotation-proof against the base.

Alternatively, it is also possible for the feed facility to be formed as a feed channel, which comprises an inlet and an outlet and is preferably fixed to the base of the deposition facility in a rotation-proof manner. The outlet is aligned with the passage opening in the hollow shoulder and is preferably arranged directly adjacent to the passage opening on the width of the hollow shoulder facing away from the workpiece plane. In this example, deposition material in powder form can be simply fed into the area of the indentation of the hollow shoulder.

In some forms, the device comprises a collar element, wherein the collar element comprises a bearing surface that runs on the workpiece plane, wherein the outer circumference of the hollow shoulder, at least neighboring the annular face, has a circular cross-section and wherein a section of the collar element extends around the outer circumference of the hollow shoulder, preferably about an angle of 180°. Preferably, the collar element is mounted pivotably on the base of the deposition facility. Further, the collar element can additionally comprise two arms that run parallel to one another and extend away from the ends of the section of the collar element that runs around the hollow shoulder.

During the movement of the deposition facility relative to the surface area, the collar element can lie with its bearing surface on the surface area and can be aligned such that the area of the hollow shoulder surrounded by the collar element points in the direction in which the deposition facility moves over the surface area. When, during the movement of the deposition facility over the surface area, the annular face is distanced from the surface area and the hollow shoulder is driven in a rotating manner such that deposition material is plasticized in the indentation, it is achieved through the collar element that plasticized material only exits the indentation through the areas underneath the annular face that are aligned opposite to the direction of movement. When the collar element extends about 180°, a strip is deposited whose width essentially corresponds to the diameter of the hollow shoulder. When the arms are additionally provided, the width of the strip is limited to the distance between the arms. Thus, in this example, a strip of a predetermined width can be produced. When the collar element is further mounted pivotably on the base about the longitudinal axis of the deposition facility, it can always be aligned such that the section of the collar element surrounding the hollow shoulder points in the direction in which the hollow shoulder moves relative to the surface area of the workpiece. In a further preferred example, a friction element can be provided on the holding facility, said friction element being driven about an axis of rotation in a rotational manner. The deposition facility can be aligned relative to the friction element such that the axis of rotation is arranged such that it runs vertically to the workpiece plane when the longitudinal axis intersects the friction element and the workpiece plane coincides with the surface of the friction element. Further, the friction element is arranged on the holding facility such that the surface of the friction element is directly limited at the surface area of a workpiece received by the holding facility such that the tangential planes of the surface of the friction element and the surface area coincide at the boundary between the surface area and the surface of the friction element.

This enables the deposition facility to initially be moved with its base relative to the holding facility such that the workpiece plane runs in the surface of the friction element or the annular face that limits the indentation in the hollow shoulder directly adjoins the friction element. This is achieved in that the axis of rotation is aligned such that it runs vertically to the workpiece plane when the longitudinal axis intersects the friction element and the workpiece plane coincides with the surface of the friction element.

In some forms, the hollow shoulder and the friction element rotate at the same speed, so that there is no friction between the annular face on the one hand and the friction element on the other hand. While the friction element is rotated, deposition material is fed into the indentation through the passage opening, wherein there is friction between the deposition material on the one hand and the friction element and the friction face of the hollow shoulder on the other hand. The deposition material introduced into the indentation is thereby plasticized due to the input of friction energy. Subsequently, when the indentation is completely filled with plasticized material, the deposition facility can be moved from the friction element down to the surface area of the workpiece to be coated, so that the plasticized material can be deposited on the surface area when a gap is created between the annular face on the one hand and the surface area on the other hand.

The provision of such a rotationally driven friction element enables, in a simple manner, the indentation in the hollow shoulder to first be filled with plasticized deposition material and then the coating process to begin on the surface area of the workpiece.

According to a further aspect of the present disclosure a method for the deposition of a material layer on a surface area of a workpiece is provided. A deposition facility is provided that includes a hollow shoulder that is rotatable about a longitudinal axis relative to the base, wherein the hollow shoulder comprises an indentation facing a workpiece plane running vertically to the longitudinal axis, said indentation being limited by a circumferential annular face about the longitudinal axis, and wherein the hollow shoulder is equipped with a passage opening running along the longitudinal axis whose diameter is smaller than that of the indentation. In this method, the hollow shoulder is driven in a rotational manner, wherein deposition material is fed through the passage opening into the indentation, and wherein the fed deposition material is plasticized in the indentation. Further, the deposition facility is moved over the surface area of the workpiece in such a way that the indentation points towards the surface area and the workpiece plane runs tangentially to the surface area at the point at which the longitudinal axis intersects the surface area, and the annular face is distanced from the surface area such that plasticized deposition material is deposited on the surface area.

The deposition material that is introduced into the indentation in the hollow shoulder through the passage opening is plasticized within the indentation due to its rotation and the input of friction energy into the deposition material. When the deposition material is moved over the surface area of the workpiece and the annular face limiting the indentation is distanced from the surface area, this plasticized material is pressed out of the indentation and deposited on the surface area. The deposition material that is fed into the indentation thus causes the plasticized deposition material to be pressed out through the gap between the annular face and the surface area and deposited on the surface and, simultaneously, to replace the deposited material with the newly fed deposition material.

The method of the present disclosure does not require that the deposition material itself rotate or otherwise be driven in a rotational manner. Rather, it is sufficient for the hollow shoulder, which is in friction contact with the deposition material, to rotate and in this way cause an energy input into the deposition material.

In some forms, an auxiliary element is mounted on the surface area of the workpiece; this auxiliary element is preferably formed from the deposition material but can also be formed from another material. Before the deposition facility is moved over the surface area of the workpiece, it is placed on the surface area such that the auxiliary element is received into the indentation and adjoins the hollow shoulder. The hollow shoulder is driven in a rotational manner such that it rubs against the auxiliary element and the auxiliary element is plasticized, wherein, once the auxiliary element has been plasticized, deposition material is fed into the indentation through the passage opening and the deposition facility is moved over the surface area of the workpiece.

The indentation in the hollow shoulder is initially filled with plasticized material in that the hollow shoulder is placed on an auxiliary element that is arranged on the surface of the workpiece in the surface area. The hollow shoulder rubs against the auxiliary element such that friction energy is input into the auxiliary element and it is plasticized. When the hollow shoulder is filled with the auxiliary material, the deposition facility is guided over the surface area, wherein the annular face provided on the hollow shoulder is distanced from the surface area and, at the same time, deposition material is fed into the indentation through the passage opening. Through the feeding of further deposition material, deposition material is pressed out through the gap between the annular face and the surface area while the deposition facility is moved over the surface area. In this manner, deposition material is deposited on the surface.

In some forms, a friction element is provided, which is driven about an axis of rotation in a rotational manner. The deposition facility can be aligned relative to the friction element such that the axis of rotation is arranged such that it runs vertically to the workpiece plane when the longitudinal axis intersects the friction element and the workpiece plane coincides with the surface of the friction element. Further, the surface of the friction element directly adjoins the surface area of the workpiece, such that the tangential planes of the surface of the friction element and the surface area coincide at the boundary between the surface area and the surface of the friction element. Before the deposition facility is moved over the surface area of the workpiece, it is placed upon the friction element such that deposition material that has been fed into the indentation comes into friction contact with the friction element and the deposition material is plasticized. When the indentation is filled with plasticized deposition material, the deposition facility is moved over the surface area of the workpiece and deposition material is further fed into the indentation through the passage opening.

The indentation is initially filled with plasticized material in such a way that the deposition facility with the hollow shoulder is placed upon a rotationally driven friction element and deposition material is then fed into the indentation through the passage opening, wherein the deposition material is plasticized due to the friction contact with the rotating friction element. Deposition material is fed until the indentation is filled with plasticized deposition material. This is held in the plasticized state in that the hollow shoulder is driven in a rotational manner and thus is in friction contact with the friction-plasticized deposition material. Subsequently, when the indentation is completely filled, the deposition facility can be moved in the aforementioned manner over the surface area, wherein a gap is provided between the annular face and the surface area, through which the plasticized material can exit the indentation and be deposited on the surface area upon further feeding of deposition material through the passage opening.

In some forms, rod-shaped deposition material can be fed through the passage opening into the indentation along the longitudinal axis and rotated about the hollow shoulder. Alternatively, it is possible for the deposition material to be fed as a powder through the passage opening into the indentation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected examples and not all possible implementations, and are not intended to limit the scope of the present disclosure.

Corresponding reference numerals indicate corresponding parts throughout the several views of the drawings.

DETAILED DESCRIPTION

Figure 1:
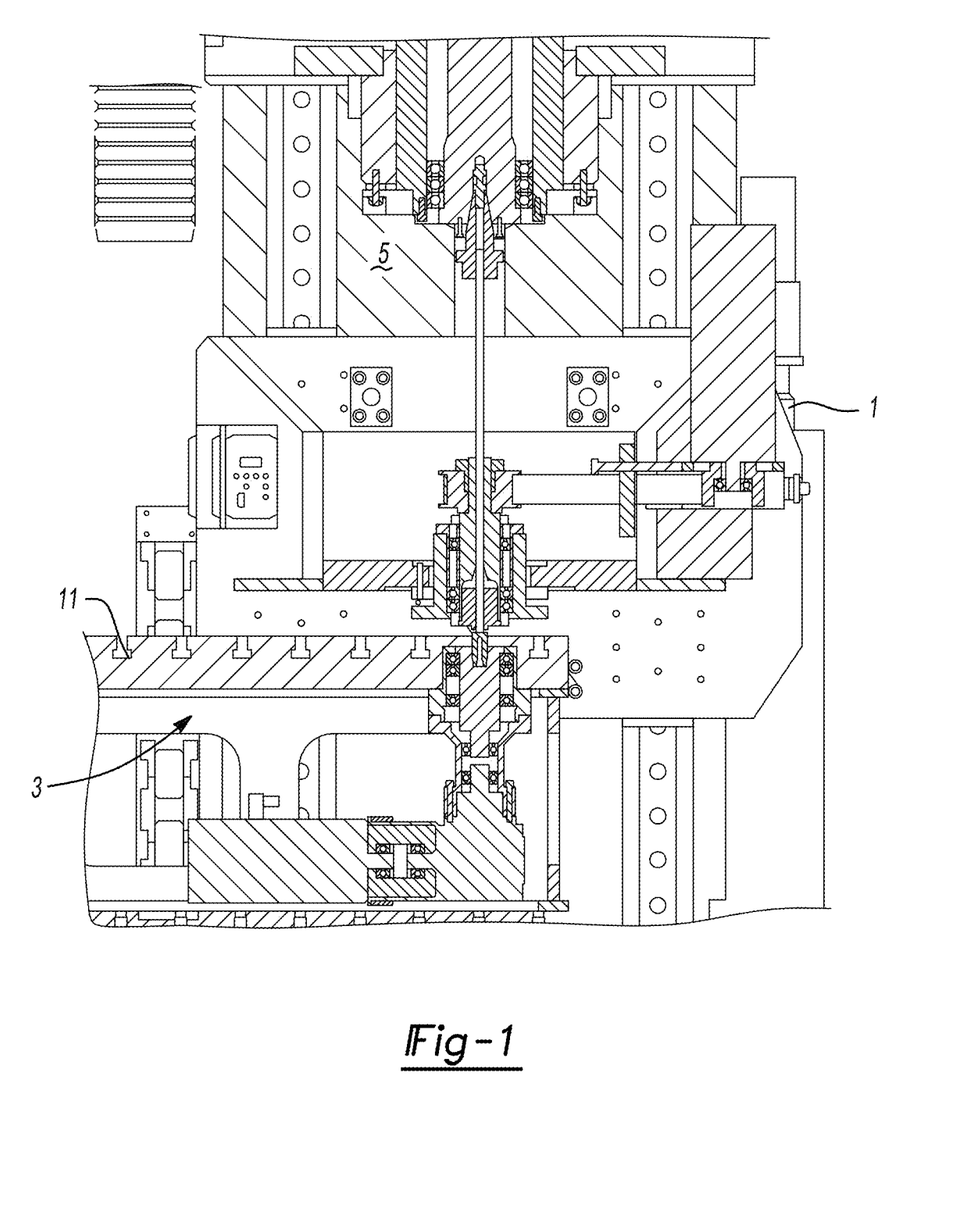
FIG. 1 shows a cross-section view of the general construction of an example of a device according to the invention.

FIG. 1 shows the general construction of an example of a device according to the invention for the deposition of a material layer on a surface area of a workpiece.

The device comprises a deposition facility 1 as well as a holding facility 3, both of which are mounted in a movable manner on a machine frame 5, such that the deposition facility 1 can be driven in all three spatial directions relative to the holding facility 3. The holding facility 3 is designed such that a workpiece 7 (see FIG. 2) can be mounted upon it in such a way that the surface area 9 to be coated points towards the deposition facility 1. In the example shown in FIG. 1, the holding facility 3 comprises a plate 11, in which cutouts are provided, in which clamping elements can be received, with which the workpiece 7 can be mounted on the plate 11.

Figure 2:
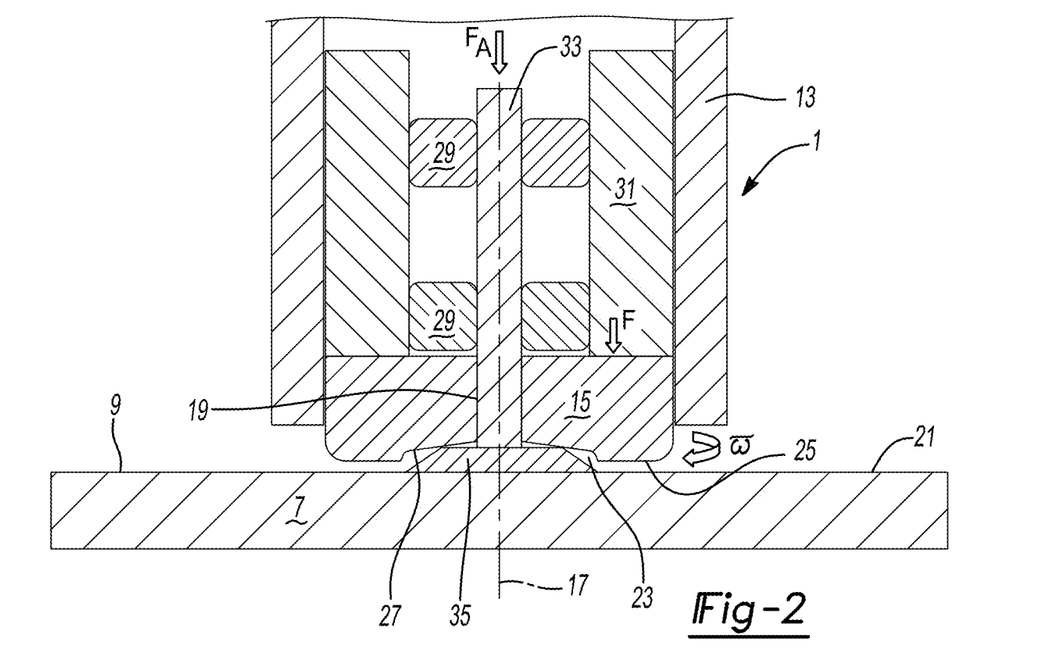
FIG. 2 shows a section from the cross-section of a first example of a device according to the invention.

In FIG. 2, a first example of a device according to the invention for the deposition of a material layer is shown in detail, wherein only the workpiece 7 and the deposition facility 1 are shown here, while the holding facility 3 and the machine frame 5 are not seen.

The first example of a device according to the invention comprises a deposition facility 1, which is equipped with a housing 13, which is connected in a movable manner to the machine frame 5 such that the deposition facility 1 can be driven relative to the holding facility and the attached workpiece 7.

The housing 13 thus constitutes a base in the sense of the present invention. Further, the deposition facility 1 according to the first example comprises a hollow shoulder 15, which is held in a rotational manner about a longitudinal axis 17 in the housing 13 and thus also rotationally relative to the base on the deposition facility 1. The hollow shoulder 15 is driven in a rotational manner by a drive, which is not shown here. Further, the hollow shoulder 15 comprises a through-hole 19, which extends along the longitudinal axis 17, about which the hollow shoulder 15 is driven in a rotational manner.

On the side facing the workpiece 7 and a workpiece plane 21 running vertically to the longitudinal axis 17, the hollow shoulder 15 comprises an indentation 23, which is limited by an annular face 25 that extends circumferentially parallel to the workpiece plane. When the deposition facility 1 is arranged on the surface area 9 of the workpiece 7, the surface area 9 and the workpiece plane 21 coincide, as shown in FIG. 2.

As can be seen further in FIG. 2, a friction face 27 surrounding the through-hole 19 is formed between the annular face 25 and the through-hole 19 in the area of the indentation 23, such that the diameter of the indentation 23 is greater than the diameter of the through-hole 19.

Finally, the deposition facility 1 comprises at least two radial bearings 29, which are aligned parallel to one another, whose outer ring is supported on a ring element 31, which is securely received in the housing 13, while the inner ring of the radial bearing 29 is aligned with the through-hole 19 along the longitudinal axis 17. Through the inner ring of the radial bearing 29 or the guide elements supported thereupon, a rod-shaped blank 33 of deposition material can be pushed through, such that it extends into the indentation 23. When there is plasticized material in the indentation 23 and the blank 33 of deposition material is fed through the through-hole 19 into the indentation 23, as shown by the arrow marked with $F_1$, the material of the blank 33 is similarly plasticized in the area of its tip, such that, when there is no gap between the annular face 25 and the surface area 9 of the workpiece 7, the indentation 23 is completely filled with plasticized material.

Figure 3:
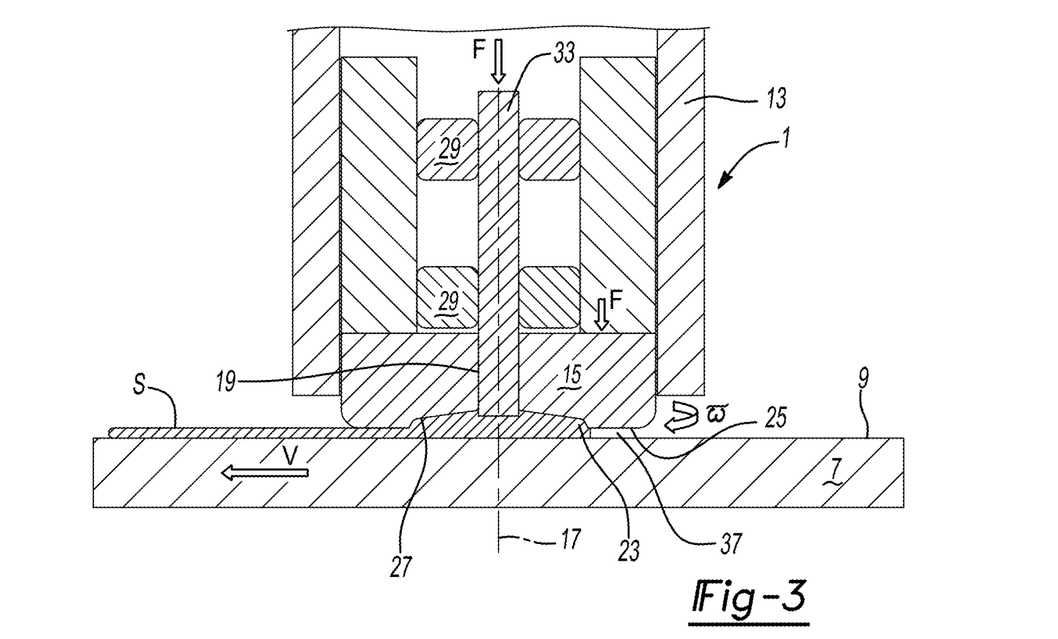
FIG. 3 shows a further section from the cross-section of the first example of a device according to the invention.

The example of a device according to the invention for the deposition of a material layer shown in FIGS. 2 and 3 is used as will be described below.

First, an auxiliary element 35 is mounted on the surface area 9 of the workpiece 7, said auxiliary element being ideally but not mandatorily formed from the same deposition material as the blank 33.

Subsequently, the deposition facility 1 is moved relative to the holding facility 3 such that the deposition facility 1 is placed upon the auxiliary element 35, wherein the latter is received in the indentation 23 of the hollow shoulder 15. The hollow shoulder 15 is driven in a rotational manner, such that it rotates relative to the auxiliary element 35, which is securely fastened to the workpiece 7, and rubs against it. In doing so, friction energy is input into the auxiliary element 35 through the friction face 27. Due to this friction energy, the auxiliary element 35 is partially or completely plasticized, and the indentation 23 is partially or completely filled with plasticized material. In this state, it is preferred for the annular face 25 to initially be as close as possible to the surface area 9 of the workpiece 7.

When the indentation 23 is partially or completely filled with plasticized material, the deposition facility 1 moves relative to the workpiece and a gap 37 is formed between the annular face 25 and the surface area 9 of the workpiece 7.

The deposition facility 1 is thus moved over the surface area 9 of the workpiece 7 such that the indentation 23 points towards to the surface area 9 and the workpiece 21 runs tangentially to the surface area 9 at the point at which the longitudinal axis 17 intersects the surface area 9, and the annular face 25 is distanced from the surface area 9.

When the surface area 9 is level, upon a movement of the deposition facility 1, the workpiece 21 runs tangentially to the surface area 9 already at the point at which the longitudinal axis 17 intersects the surface area 9 when the deposition facility 1 is pushed parallel to the surface area 9.

During the movement of the deposition facility 1, the blank 33 of the deposition material is fed through the through-hole into the indentation 23, such that further deposition material enters the area of the indentation 23, wherein further friction energy is input into the area of the indentation due to the rotation of the hollow shoulder 15. This inflow of friction energy leads to the newly fed deposition material being similarly plasticized. At the same time, through the movement of the blank 33 towards the indentation 23, already plasticized material is pushed out of the indentation 23 through the gap 37 between the annular face 25 and the surface area 9 and deposited as a material layer S on the surface area 9 of the workpiece 7 when the deposition facility 21 moves relative to the workpiece 7.

In this procedure, it is merely necessary for the hollow shoulder 15 to be driven in a rotational manner, while the deposition material in the form of a rod-shaped blank 33 does not need to rotate vis-à-vis the housing 13 or the base of the deposition facility 1. It is thus not necessary to rotationally drive the deposition material itself. Rather, it is sufficient for friction energy to be input into the deposition material in the area of the indentation 23 through the hollow shoulder 15 in order to plasticize it.

Figure 4:
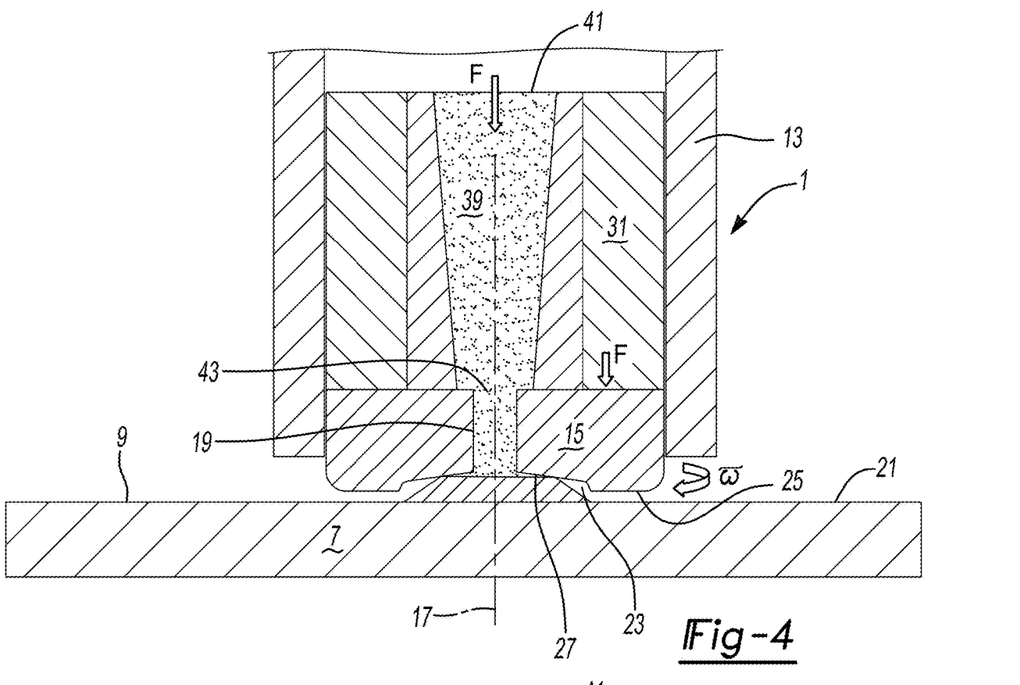
FIGS. 4 and 5 show a section from the cross-section of a second example of a device according to the invention.
Figure 5:
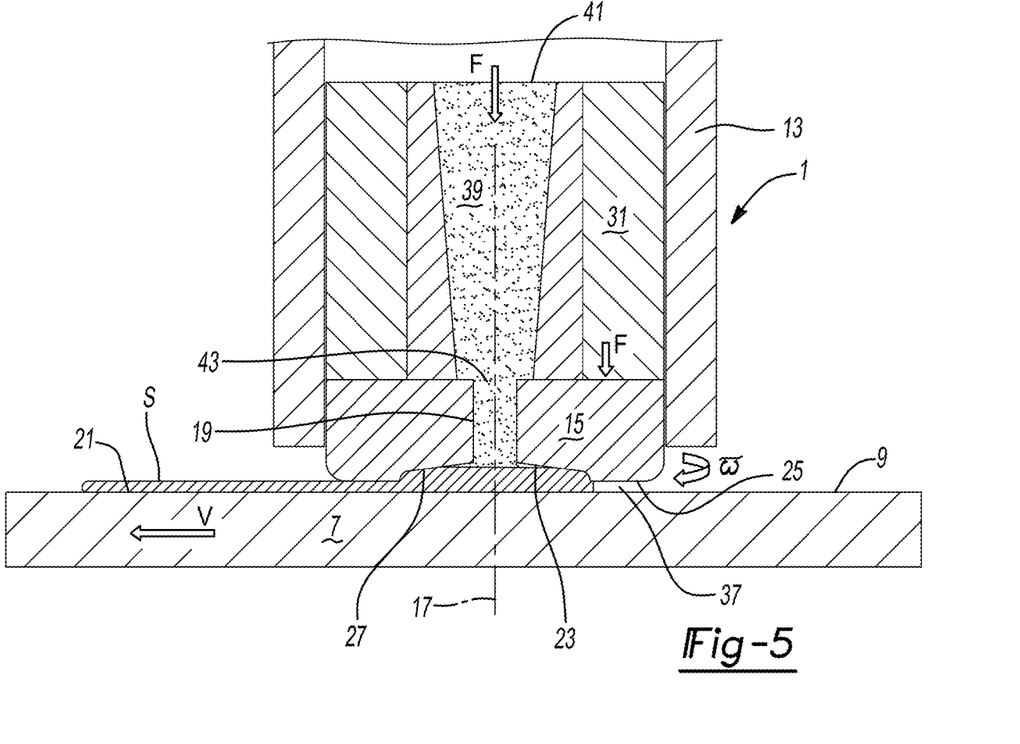

In the second example shown in FIG. 4, a rotationally driven hollow shoulder 15 is similarly provided on the deposition facility 1, said shoulder being held rotatably in a housing 13, wherein the housing 13, which also forms a base here, is held in a movable manner relative to the holding facility 3 not shown in FIG. 4 or 5, in that it is mounted on a machine frame that is similarly not shown in FIG. 4 or 5.

In this example, as well, the hollow shoulder 15 comprises a through-hole 19, which extends from a side facing the workpiece plane 21 and/or the surface area 9 of the workpiece 7 to a side of the hollow shoulder 15 facing away from the former, and through the hollow shoulder, wherein the through-hole 19 also runs along the longitudinal direction 17 about which the hollow shoulder 15 is driven in a rotational manner.

In the interior of the housing 13, a feed channel 39 is provided, which in this example is mounted thereupon in a rotation-proof manner, which comprises an inlet 41 as well as an outlet 43. However, it is also conceivable that the feed channel 39 rotates along with the hollow shoulder 15.

The outlet 43 of the feed channel 39 is arranged such that it directly adjoins the end of the through-hole 19 of the rotationally driven hollow shoulder 15, which is arranged on the side of the hollow shoulder 15 facing away from the workpiece plane 21.

The feed channel 39 is thus aligned with the through-hole 19 along the longitudinal axis 17 of the deposition facility 1, according to the second example. Through the feed channel 39, deposition material in powder form can be introduced from the inlet 41 to the outlet 43 and through the through-hole 19 into the indentation 23 of the hollow shoulder 15.

This second example of a device, as shown in FIGS. 4 and 5, is used as follows for the deposition of a material layer on a surface area 9 as will be described in detail below.

First, in this case, an auxiliary element 35 is mounted securely on the surface area 9 of the workpiece 7 and the deposition facility 1 is arranged over the auxiliary element 35 such that the latter is arranged in the indentation 23 and is in friction contact with the friction face 25 of the indentation. When the hollow shoulder 15 is driven in a rotational manner, friction energy is again introduced into the auxiliary element 35, and it is plasticized.

When the friction element 35 is partially or completely plasticized and the indentation 23 is partially or completely filled with plasticized material, the deposition facility 1 is moved relative to the workpiece 7, and it is ensured that a gap 37 is provided between the annular face 25 and the surface area 9 of the workpiece 7, i.e. the annular face 25 is distanced from the surface area 9.

The movement of the deposition facility 1 relative to the workpiece 7 again occurs such that the indentation 23 points towards the surface area 9 and the workpiece plane 21 runs tangentially to the surface area 9 at the point at which the longitudinal axis intersects the surface area.

At the same time, deposition material in powder form is pressed through the feed channel 39 and through the through-hole 19 into the indentation 23 while the deposition facility 1 continues to move relative to the workpiece 7. Through the introduced deposition material in powder form, plasticized deposition material is already pressed out of the indentation 23 through the gap 37 and deposited as a material layer S in the surface area 9 on the workpiece 7.

Thus, in this example, as well, it is not necessary to drive the deposition material deposited on the surface area 9 in any rotational manner whatsoever; rather, it is sufficient for the friction energy to be input in the area of the indentation 23 through the rotationally driven hollow shoulder 15 such that plasticized material is constantly present there, in that not yet plasticized material is introduced through the through-hole 19, while plasticized material simultaneously exits from the indentation 23 through the gap 37 and is deposited on the surface area for the formation of the material layer S.

Figure 6:
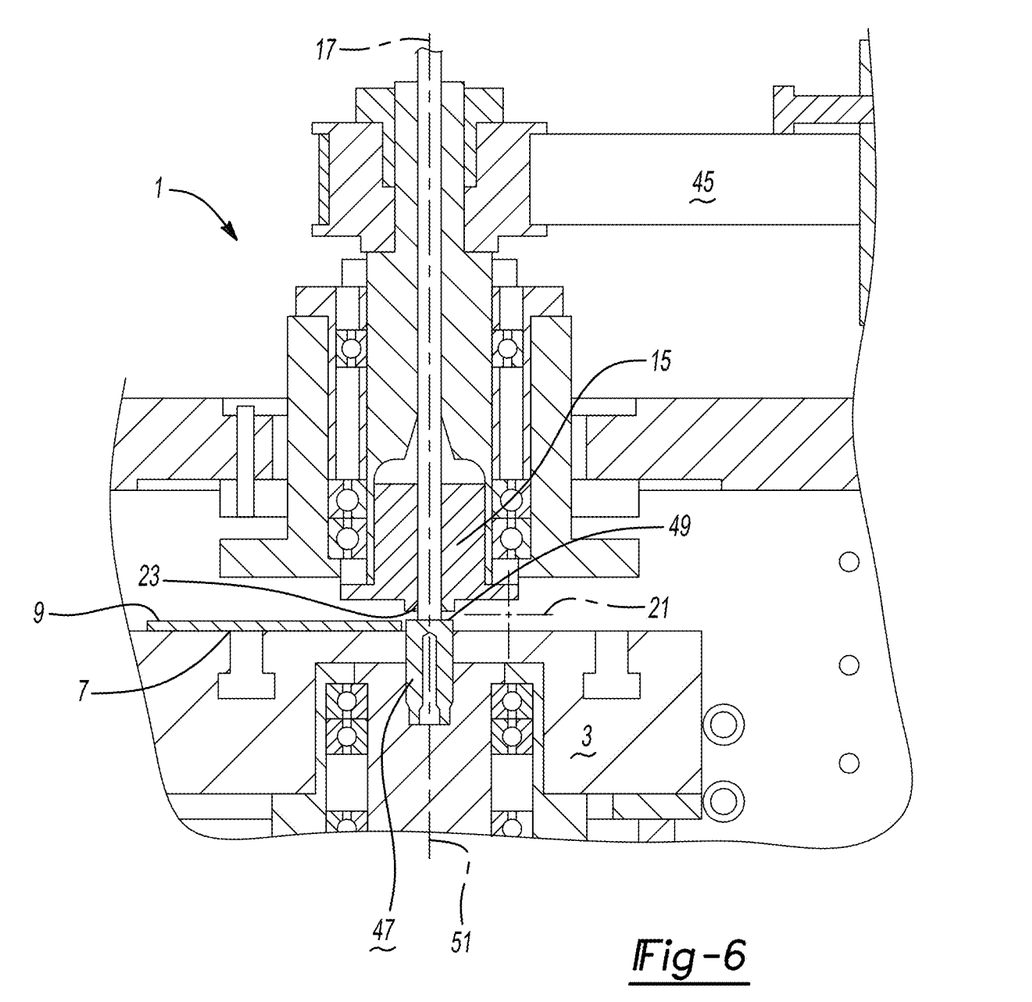
FIG. 6 shows a section from the cross-section of a third example of a device according to the invention.

The third example of a device according to the invention for the deposition of a material layer on a workpiece, as shown in FIG. 6, comprises a deposition facility 1, which is formed in the same manner as the deposition facility 1 shown in FIGS. 2 and 3, i.e. it comprises a hollow shoulder 15, on whose end facing a workpiece and a holding facility 3 an indentation 23 is provided, wherein the hollow shoulder 15 is driven in a rotational manner about a longitudinal axis 17. In the example shown in FIG. 6, the drive of the hollow shoulder 15 occurs with the aid of a belt drive 45.

As already described in connection with the example shown in FIGS. 2 and 3, the deposition facility 1 comprises, in addition to the hollow shoulder 15, the feed facility for rod-shaped deposition material, comprising two or more radial bearings 29. Further, the deposition facility 1 can be moved relative to the holding facility 3 such that the indentation 23 points to the surface area 9 of the workpiece 7, wherein the workpiece plane 21 of the deposition facility 1 runs tangentially to the surface area at the point at which the longitudinal axis 17 intersects the surface area of the workpiece.

By contrast to the first example described in FIGS. 2 and 3, the third example shown in FIG. 6 comprises a friction element 47, which is driven in a rotational manner by a drive not shown in FIG. 6 and comprises a surface 49 that is arranged on the holding facility 3 such that the surface 49 points to the workpiece plane 21 and/or the deposition facility 1. Thus, the annular face 25 of the hollow shoulder 15 can be placed upon the surface 49 of the friction element 47 when the deposition facility 1 is driven accordingly relative to the holding facility 3. In particular, the surface 49 of the friction element 47 and the axis of rotation 51 about which the friction element 47 is driven in a rotational manner are aligned such that they run vertically to the workpiece plane 21 of the deposition facility 1 when the deposition facility 1 is arranged over the friction element 47.

When a workpiece 7 is further mounted on the holding facility 3, as shown in FIG. 6, the friction element 47 is arranged such that the surface 49 of the friction element 47 directly adjoins the surface area 9 of the workpiece 7, which is received on the holding facility 3.

Then, the surface area 9 and the surface 49 of the friction element 47 are aligned with respect to one another such that the tangential planes of the surface 49 of the friction element 47 and the surface area 9 coincide at the boundary between the surface area 9 and the surface 49 of the friction element 47. When both surfaces 9, 49 are formed in a level manner, this means only that the surface 49 and the surface area 9 run on the same plane.

The device according to the third example can be used as follows for the deposition of a material layer on a workpiece 7 as will be described in detail below.

First, the deposition facility 1 is arranged with respect to the friction element 47 such that the axis of rotation 51 of the friction element 47 runs vertically to the workpiece plane 21 of the deposition facility 1. Further, the longitudinal axis 17 of the hollow shoulder 15, which in this case coincides with the longitudinal axis of the deposition facility 1, must intersect the surface 49 of the friction element 47.

Subsequently, the hollow shoulder 15 is moved towards the friction element 47 by means of the overall deposition facility 1 such that the annular face 25 (see FIG. 2) adjoins the surface 49 of the friction element 47. Preferably, the hollow shoulder 15 and the friction element 47 are driven with the same direction of rotation and the same speed, so that there is no friction between the friction element 47 on the one hand and the hollow shoulder 15 on the other hand. When the two are brought into an adjoining position, deposition material is fed through the passage opening 19 in the hollow shoulder 15 into the indentation 23 of the hollow shoulder 15, wherein the rod-shaped deposition material comes to adjoin the surface 49 of the rotating friction element 47 with its free end. The friction element 47 thus rubs against the deposition material and plasticizes it. This occurs until the indentation 23 of the hollow shoulder 15 is completely filled with plasticized material.

Subsequently, the deposition facility 1 is moved parallel to the surface 49 of the friction element 47 and the coinciding surface area 9 of the workpiece 7 towards the workpiece 7, wherein the annular face 25 is now held at a distance to the surface area 9, such that a gap is formed between the annular face 25 of the hollow shoulder 15 and the surface area 9 of the workpiece 7.

When deposition material is now further fed into the indentation 23 of the hollow shoulder 15, already plasticized material is pressed out through the gap between the annular face 25 and the surface area 9 and deposited on the surface area 9 such that a material layer is formed.

Thus, in this example, it is achieved with the aid of the friction element 47 that deposition material can first be plasticized within the indentation 23 before the actual deposition of the material layer.

Figure 7:
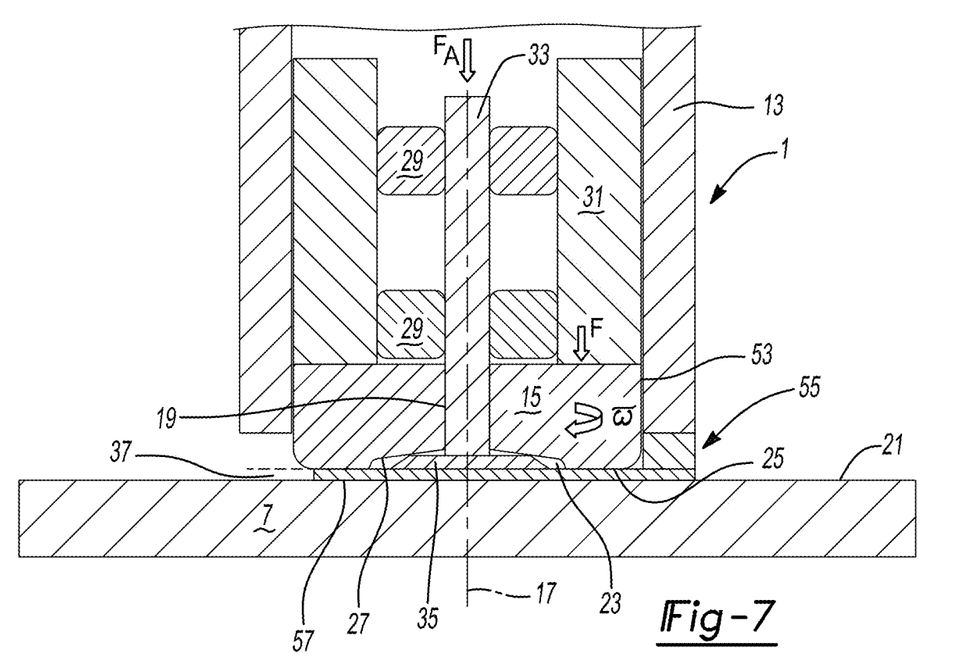
FIG. 7 shows a section from the cross-section of a fourth example of a device according to the invention.
Figure 8:
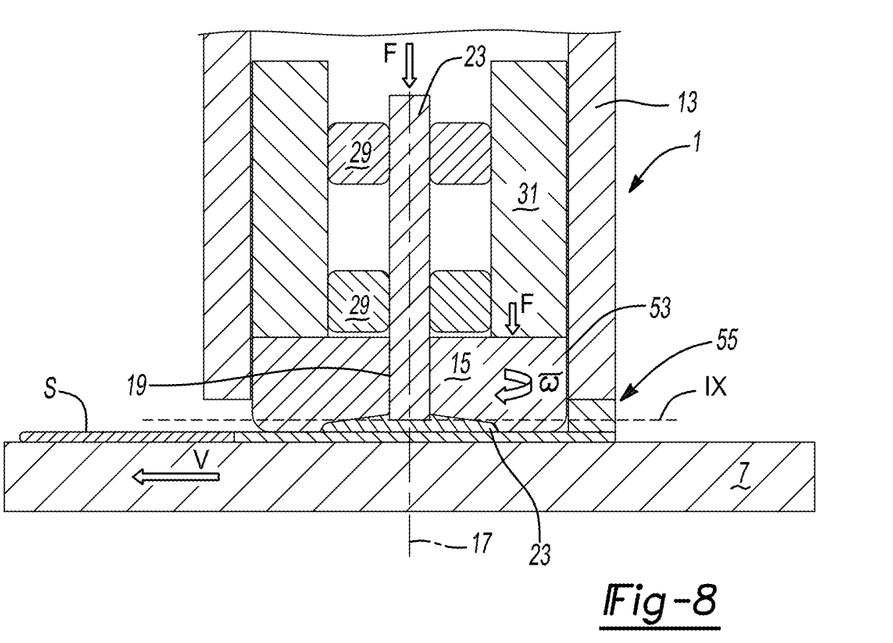
FIG. 8 shows a further section from the cross-section of the fourth example of a device according to the invention.
Figure 9:
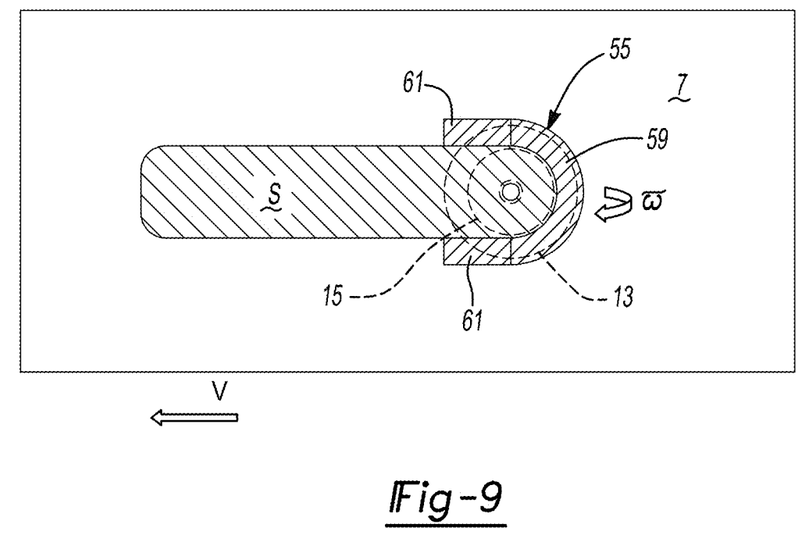
FIG. 9 shows a cross-section view vertical to the longitudinal axis marked with IX in FIG. 8 in the plane of the fourth example shown in FIG. 8.

The fourth example shown in FIG. 7 through 9 is constructed very similarly to the first example, which has been shown in FIGS. 2 and 3 and described in connection with these figures. The fourth example of a device according to the invention also comprises a deposition facility 1 with a housing 13, said facility being connected in a movable manner to the machine frame 5 (not shown in FIGS. 7 and 8). Thus, the deposition facility 1 can be driven relative to the holding facility 3 and the attached workpiece 7. Here, too, the housing 13 thus constitutes a base in the sense of the invention. Further, the deposition facility 1 according to the fourth example comprises a hollow shoulder 15, which is held rotatably about a longitudinal axis 17 in the housing 13 and thus also rotatable relative to the base on the deposition facility 1. The hollow shoulder 15 is driven in a rotational manner by a drive, which is not shown. The hollow shoulder 15 further comprises a through-hole 19, which extends along the longitudinal axis 17 about which the hollow shoulder 15 is driven in a rotational manner. On the side facing the workpiece 7 and a workpiece plane 21 running vertically to the longitudinal axis 17, the hollow shoulder 15 comprises an indentation 23, which is limited by an annular face 25 that extends circumferentially parallel to the workpiece plane. Finally, the outer circumference 53 of the hollow shoulder 15 is formed circularly in cross-section.

When the deposition facility 1 is arranged on the surface area 9 of the workpiece 7, the surface area 9 and the workpiece plane 21 coincide, as shown in FIG. 8. As can be seen further in FIG. 8, a friction face 27 surrounding the through-hole 19 is formed between the annular face 25 and the through-hole 19 in the area of the indentation 23, such that the diameter of the indentation 23 is greater than the diameter of the through-hole 19. Finally, the deposition facility 1 here also comprises at least two radial bearings 29, which are aligned parallel to one another, whose outer ring is supported on a ring element 31, which is securely received in the housing 13, while the inner ring of the radial bearing 29 is aligned with the through-hole 19 along the longitudinal axis 17. Through the inner ring of the radial bearing 29 or the guide elements supported thereupon, a rod-shaped blank 33 of deposition material can be pushed through, such that it extends into the indentation 23. When there is already plasticized material in the indentation 23 and the blank 33 of deposition material is fed through the passage opening 19 into the indentation 23, as shown by the arrow marked with $F_1$, the material of the blank 33 is similarly plasticized in the area of its tip, such that, when there is no gap between the annular face 25 and the surface area 9 of the workpiece 7, the indentation 23 is completely filled with plasticized material.

By contrast to the first example described in FIGS. 2 and 3, the fourth example comprises a collar element 55, which, in the fourth example shown here, is mounted on the housing 13 such that it can pivot about the longitudinal axis 17. The collar element 55 surrounds the hollow shoulder 15 in a manner that is described below. The collar element 55 additionally comprises a bearing face 57, which runs in the workpiece plane 21 and is thus distanced in an axial direction of the longitudinal axis 17 from the annular face 25 of the hollow shoulder 15.

As shown in FIG. 9, the collar element 55 initially comprises a section 59, which has a circular profile in the example shown here and which extends around the hollow shoulder 15 in the example shown here about an angle of 180°. Further, the collar element 55 comprises two arms 61, which run parallel to one another and extend away from the ends of the section 59 of the collar element 55 that runs around the hollow shoulder 15.

During the movement of the deposition facility 1 relative to the surface area 9 of the workpiece 7, when the annular face 25 of the hollow shoulder 15 is distanced from the surface area 9 by the gap 37, the collar element 55 lies with its bearing face 57 upon the surface area. Further, due to its pivotability about the longitudinal axis 17, the collar element 55 is aligned such that the section 59 of the collar element 55 that surrounds the hollow shoulder 15 points in the direction in which the deposition facility 1 moves over the surface area 9. The arms 61 point backwards, counter to the direction of movement, and limit a strip whose width corresponds to the diameter of the hollow shoulder 15.

When the hollow shoulder 15 is driven in a rotational manner, such that deposition material is plasticized in the indentation 23, it is achieved through the collar element 55 that plasticized material only exits the indentation 23 in the areas underneath the annular face 25 that are aligned counter to the direction of movement. Because the section 59 of the collar element 55 extends about 180° and the arms 61 connect thereto parallel to one another, a material layer S is deposited whose width essentially corresponds to the diameter of the hollow shoulder 15.

Further, because the collar element 55 is mounted on the housing 13 in a pivotable manner about the longitudinal axis 17 of the deposition facility 1, it can always be aligned such that the section 59 of the collar element 55 surrounding the hollow shoulder 15 points in the direction in which the hollow shoulder 15 moves relative to the surface area 9 of the workpiece 7. It thus follows the direction of movement.

The previously described collar element 55 has been described in connection with the fourth example, which is strongly similar to the first example. However, it is equally possible to mount the previously described collar element 55, which in the example described here is only mounted pivotably on the base and comprises backwards extending arms 61, on the second or third example.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A device for the deposition of a material layer on a surface area of a workpiece, the device comprising:
a holding facility for receiving the workpiece,
a deposition facility,
wherein the deposition facility and the holding facility can be moved relative to one another,
wherein the holding facility is designed such that the workpiece is held on the holding facility so that the surface area of the workpiece points to the deposition facility,
wherein the deposition facility comprises a base,
wherein the deposition facility comprises a hollow shoulder driven in a rotating manner about a longitudinal axis relative to the base,
wherein the hollow shoulder comprises an indentation pointing towards a workpiece plane perpendicular to the longitudinal axis, said indentation being limited by a circumferential annular face about the longitudinal axis,
wherein the hollow shoulder is equipped with a passage opening running along the longitudinal axis, the diameter of which is smaller than that of the indentation,
wherein the deposition facility comprises a feed facility for deposition material, which is arranged on the side of the hollow shoulder facing away from the workpiece plane such that deposition material can be introduced from the feed facility through the passage opening into the indentation,
wherein deposition material introduced into the indentation is continuously supplied with frictional energy by rotation of the hollow shoulder, due to the friction between the hollow shoulder and the deposition material, so that the deposition material is plasticized in the indentation, and
wherein the deposition facility and the holding facility can be moved relative to one another in such a manner that, during the relative movement, the workpiece plane runs tangentially to the surface area of a workpiece held on the holding facility at a point at which the longitudinal axis intersects the surface area of the workpiece.

2. The device according to claim 1, further comprising a machine frame, wherein the holding facility and the deposition facility are held on the machine frame, and
wherein the holding facility and/or the deposition facility are movable vis-à-vis the machine frame, such that the deposition facility and the holding facility can be moved relative to one another.

3. The device according to claim 1 or claim 2, wherein the annular face runs parallel to the workpiece plane.

4. The device according to claim 3, wherein the deposition facility and the holding facility are configured such that the annular face is spaced apart from the workpiece plane when the deposition facility and the holding facility are moved relative to one another.

5. The device according to claim 1, wherein the hollow shoulder comprises a friction face, which is arranged between the annular face and the passage opening, and wherein the friction face surrounds the passage opening.

6. The device according to claim 1, wherein the feed facility comprises one or more guide elements that form a conveyance path for rod-shaped deposition material, and wherein the conveyance path extends along the longitudinal axis.

7. The device according to claim 6, wherein the one or more guide elements comprise at least one radial bearing, which comprises an inner ring that is aligned with the passage opening.

8. The device according to claim 1, wherein the feed facility comprises a feed channel that comprises an inlet and an outlet, wherein the outlet is aligned with the passage opening.

9. The device according to claim 8, wherein the feed channel is non-rotatably coupled to the base.

10. The device according to claim 8, wherein the outlet directly adjoins the passage opening on the side of the hollow shoulder facing away from the workpiece plane.

11. The device according to claim 1, wherein a collar element is provided,
- wherein the collar element comprises a bearing face that runs in the workpiece plane,
- wherein an outer circumference of the hollow shoulder, at least neighboring the annular face, has a circular cross-section, and
- wherein a section of the collar element extends around at least a portion of the outer circumference of the hollow shoulder.

12. The device according to claim 11, wherein the section of the collar element extends around the outer circumference of the hollow shoulder by an angle of about 180 degrees.

13. The device according to claim 1, wherein the holding facility comprises a friction element, which is driven in a rotational manner about an axis of rotation,
- wherein the deposition facility can be aligned relative to the friction element such that the axis of rotation is arranged such that it runs vertically to the workpiece plane when the longitudinal axis intersects the friction element and the workpiece plane coincides with the surface of the friction element, and
- wherein the friction element is arranged on the holding facility such that the surface of the friction element directly adjoins the surface area of a workpiece received on the holding facility such that the tangential plane of the surface of the friction element and of the surface area coincide at the boundary between the surface area and the surface of the friction element.

* * * * *